United States Patent [19]

Sapp et al.

[11] Patent Number: 5,217,105

[45] Date of Patent: Jun. 8, 1993

[54] SORTING CONVEYOR SYSTEM AND DIVERT SWITCH AND CROSSOVER SWITCH FOR SAID SYSTEM

[75] Inventors: Gordon K. Sapp; Donald G. Rearic, both of Danville, Ky.

[73] Assignee: Babcock Industries, Inc., Fairfield, Conn.

[21] Appl. No.: 807,493

[22] Filed: Dec. 16, 1991

[51] Int. Cl.[5] .............................................. B65G 37/00
[52] U.S. Cl. ..................................... 198/372; 198/440
[58] Field of Search ......................... 198/372, 365, 440

[56] References Cited

U.S. PATENT DOCUMENTS

| | | | |
|---|---|---|---|
| 3,669,245 | 6/1972 | Wooten et al. | 198/335 |
| 3,731,782 | 5/1973 | Del Rosso | 198/350 X |
| 3,735,867 | 5/1973 | Vanderhoof et al. | 198/440 X |
| 3,770,100 | 11/1973 | McCaul | 198/365 X |
| 3,986,596 | 10/1976 | Hamilton | 198/365 |
| 4,711,341 | 12/1987 | Yu et al. | 198/372 |
| 4,717,011 | 1/1988 | Yu et al. | 198/372 X |
| 4,732,259 | 3/1988 | Yu et al. | 198/372 X |
| 4,738,347 | 4/1988 | Brouwer et al. | 198/372 |
| 4,971,190 | 11/1990 | Berends et al. | 198/372 X |
| 5,027,939 | 7/1991 | Kilper et al. | 198/372 X |

Primary Examiner—Robert P. Olszewski
Assistant Examiner—Cheryl L. Gastineau
Attorney, Agent, or Firm—Gilliam & Stockwell

[57] ABSTRACT

A slat sorter comprises a main line conveyor with a transport surface on which pusher elements are mounted. The main conveyor is driven by a bearing chain that cooperates with a sprocket that is in turn driven by an electric motor. The pusher elements are selectively diverted by a divert switch from forward travel in a straight-through mode to diagonal travel across the transport surface in a divert mode to engage and direct articles to a takeaway conveyor. The divert switch comprises a switch arm that is positively actuated to both a home position for straight-through mode and a divert position for divert mode by a rotary solenoid. A mechanical crossover switch is provided to guide the pusher elements in the proper diagonal path. Two one-way, spring biased fingers are pivotable between a rest position and a through guide position. The pusher elements engage and pivot the appropriate guide finger to its though position to facilitate travel by the pusher elements in the divert mode.

30 Claims, 5 Drawing Sheets

SORTING CONVEYOR SYSTEM AND DIVERT SWITCH AND CROSSOVER SWITCH FOR SAID SYSTEM

TECHNICAL FIELD

The present invention relates generally to sorting conveyor systems and, more particularly, to a slat sorter and a high speed divert switch and a crossover switch for the slat sorter.

BACKGROUND OF THE INVENTION

Sorting conveyor systems are commonly found in manufacturing and storage facilities. These conveyor systems function to transport and direct articles to specific locations for later processing and/or handling. They are particularly useful, for example, in loading dock areas of manufacturing plants for directing boxed products to the desired processing or loading site.

One type of sorting conveyor system used for this purpose is commonly known as a slat sorter. This design includes a plurality of transverse tubes or slats that form the transport surface. A plurality of pusher elements or divert shoes are supported by the transport surface and are guided to travel along either of opposing sides of the surface during normal forward operation. When it is necessary to direct an article from the main conveyor run to an adjacent takeaway conveyor, a switch mechanism causes an assigned set of divert shoes to be diverted to slide across the conveyor surface in a diagonal direction. The divert shoes thus engage and direct the article to the takeaway conveyor.

In order to increase the operating efficiency of this type of conveyor, it is necessary to increase the speed with which slat sorters operate. The forward velocity of the slat sorter is limited by, among other things, the speed of the switch mechanism in selectively diverting the divert shoes. Most prior art switch actuators are pneumatically operated. When the switch actuator is activated, the switch is driven from a home position to a divert position. Upon deactivation of the switch actuator, the switch is returned to the home position by return pneumatic action or the biasing action of a return spring. The operating speed of such a switch design is limited by the physical nature of the components.

It is apparent that the lead time for signaling the activation of the switch actuator is a critical factor in proper operation. Some prior art slat sorter designs have experienced difficulty in coordinating the timing of the signal to actuate and control the switch mechanism. In fact, at faster operating speeds it may even become necessary to adjust the upstream position of the sensor that signals actuation in order to provide the proper timing. It can be appreciated that such designs require constant adjustment and, hence, are inconvenient to utilize. Further, such adjustment reduces the overall operational efficiency of these conveyor systems.

The operational speed of slat sorters is also affected by the means used to drive the transport surface. Most slat sorters with sprocket/chain assemblies use bushed chains that have moderate frictional resistance. This tends to put additional load on the prime mover. This in turn tends to inhibit conveyor speed. Other designs use a bushed chain with outboard precision bearing which adds to the complexity of the machine.

Many slat sorters are also designed with the capability of diverting packages to takeaway conveyors positioned on either side of the main conveyor. These sorters have the ability to support and guide divert shoes on either side of the transport surface and divert the shoes to shift diagonally across the surface in either direction. To achieve this end these slat sorters are provided with a divert shoe guiding network with tracks that have a crossing configuration. These designs necessarily incorporate a crossover switch at the intersection of the crossing tracks. Most prior art designs again incorporate pneumatic switches that significantly increase the complexity and thus cost of the slat sorter.

Accordingly, there is a need to overcome the drawbacks and disadvantages of the prior art designs described above. An improved divert switch is desired that will allow more efficient and dependable higher speed operation. An improved crossover switch is also needed. Both switches used in the slat sorter should be easy and economical to manufacture and offer enhanced durability for a longer service life.

SUMMARY OF THE INVENTION

It is therefore a primary object of the present invention to overcome the above described limitations and disadvantages of prior art slat sorters.

An additional object of the present invention is to provide a slat sorter that is capable of operation at higher speeds than possible with previously known designs.

Still another object of the present invention is to provide a slat sorter having a divert switch for use in a slat sorter that is positively actuated between the home position and divert position in both motive directions.

Another object of the present invention is to provide a crossover switch for use with a slat sorter that eliminates the need for extraneous actuators.

Yet another object of the present invention is to provide a slat sorter than includes switching components that operate with dependable efficiency and have a long service life.

It is yet another object of the present invention to provide a slat sorter with a divert switch having an optical sensor that does not require position adjustment at high operating speeds.

It is still another object of the present invention to provide a slat sorter with divert and crossover switches of simplified and cost-efficient design.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, novel divert and crossover switches for use with a slat sorter are provided. The improved design of the divert switch is particularly valuable in increasing the operational speed of the slat sorter. The diverter switch and the crossover switch are both comprised of few components and thus are of simplified design. This aids in reducing the overall cost of manufacturing the diverter switch and, hence, a slat sorter incorporating the switch while improving operating efficiency of the sorter.

The slat sorter of the present invention includes a main line conveyor that transports articles in a forward direction and provides selective diversion of the articles as desired to takeaway conveyors that are positioned at strategic points along the sides of the main conveyor. The main conveyor includes a frame that supports a transport surface. The transport surface is preferably comprised of a plurality of transverse tubes or slats that extend between the sides of the frame. The transport surface supports a plurality of pusher elements or divert shoes that are mounted to allow for lateral shifting across the transport surface. More specifically, the divert shoes generally travel with the main line conveyor along either of opposing sides of the transport surface when the slat sorter is operating in a straight-through mode, i.e. the article is moving forwardly for later downstream handling. Alternatively, as will be described in more detail below, the divert shoes may be selectively diverted to slide across the transport surface in a diagonal path in the divert mode to engage and direct articles to a takeaway conveyor.

Guide tracks are mounted to the conveyor frame beneath the transport surface to engage a guide member depending from each divert shoe so as to guide the shoes in either the forward direction when in straight-through mode or, alternatively, diagonally across the transport surface when in the divert mode.

In order to initiate the divert mode, a divert switch is provided at selected positions along the conveyor. The divert switch intercepts the divert shoes when actuated and directs them toward the predetermined diagonal path necessary to direct an article to the selected takeaway conveyor. The divert switch comprises a base that is attached to the main line conveyor. A switch arm is mounted to the base so as to be pivotable between a home position defining the straight-through mode and a divert position defining the divert mode.

In an important aspect of the invention, the divert switch includes means for positively actuating the movement of the switch arm to both the home and divert positions. More particularly, a rotary solenoid cooperates with the switch arm to actuate the pivoting movement in both directions. For example, in certain applications when the rotary solenoid is pulsed in the clockwise direction, the switch arm is positively pivoted from the home position to the divert position. Subsequently, when the rotary solenoid is pulsed in the counterclockwise direction, the switch arm is positively pivoted from the divert position back to the home position. This is a significant improvement over prior art pneumatic actuators that drive the switch arm through a linkage assembly, which physically limits the switching time to a great degree. By positively actuating the movement of the switch arm in both directions with a rotary solenoid, the inventive divert switch significantly shortens the switching time, allowing the slat sorter to operate at higher speeds. It can also be appreciated that the rotary solenoid generates actuation of the switch arm with planar operation, thus minimizing space requirements.

To further optimize the operation of the inventive divert switch, the switch arm is provided with an arcuate contour or curvature. Thus, as the guide member of the divert shoe engages the switch arm in the divert position, the divert shoe smoothly transitions from forward movement to diagonal movement. Furthermore, the shock loading on the divert shoe is reduced, leading to longer service life.

Preferably, the curvature of the switch arm is such that when in the divert position, a tangent drawn at the critical point adjacent the exit of engagement between the switch arm and the divert shoe guide member defines an oblique angle that is greater relative to the axis of forward travel than the divert angle. This allows the divert shoes to pass through the switch area and reach the diagonal guide track as quickly as possible, optimizing the time/space relationship of the switch configuration. The divert switch cooperates with a sensor that is attached to the conveyor frame upstream from the switch arm. The sensor counts the pusher elements as they pass by and signals a programmable controller which in turn orders the rotary solenoid to pivot the switch arm to the divert position at the appropriate time according to operational requirements. Advantageously, the design of the novel divert switch in combination with the programmable controller allows the sensor to be mounted in a fixed upstream position without the need for adjustment of the sensor even when the conveyor is operated at higher speeds.

In order to efficiently handle the diversion of articles off either side of the main conveyor, the slat sorter is provided with a crossing track network at various strategic positions relative to the takeaway conveyors. This crossing track network is adapted to guide the divert shoes in either direction across the transport surface depending on diversion requirements. At the point of crossing, the network is provided with a crossover switch that ensures free, unimpeded travel for the divert shoes in the correct diagonal direction.

The inventive crossover switch is designed for purely mechanical operation. The switch includes a base that is attached to the main line conveyor and includes crossing channels that align with corresponding diagonal guide tracks. Two guide fingers are pivotally mounted to the base of the crossover switch. When in the rest position, each guide finger is positioned directly in the path of travel of a respective diagonal direction. As a divert shoe traveling diagonally across the transport surface reaches the crossover switch, the guide member of the divert shoe engages and forces the guide finger to pivot to a pass position. The guide member passes along the channel now created by the relative positions of the guide fingers. After the divert shoe has passed the guide fingers, a torsion spring in the pivoted guide finger urges it to return to its rest position. The efficient mechanical action of the crossover switch eliminates the need for pneumatic actuators to generate the switching action.

An additional improvement provided by the slat sorter is the incorporation of a precision bearing chain to assist the driving operation of the transport surface. The precision bearing chain enhances the efficiency and speed of the slat sorter as compared with prior art designs.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

A divert switch 10 and a crossover switch 12 constructed in accordance with the teachings of the present invention are disclosed as cooperating with a slat sorter 14. It will be appreciated from the discussion below in conjunction with the drawings of the preferred embodiment, that the incorporation of the divert switch 10 and crossover switch 12 with the other components allows the slat sorter 14 to operate at higher speeds and increases its efficiency with a simplified design.

Figure 1:
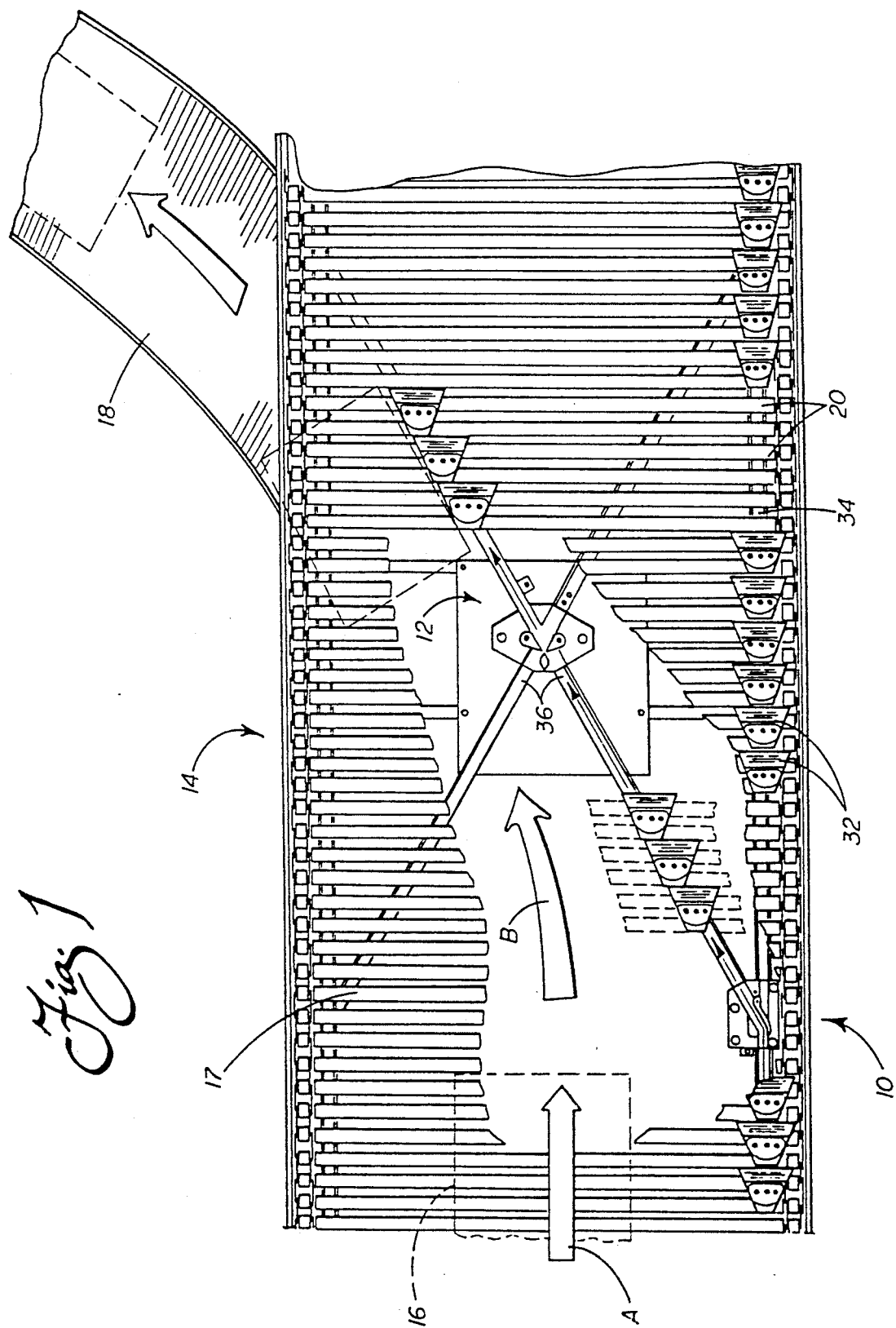
FIG. 1 is a plan view of the slat sorter with the transport surface partially broken away to illustrate the positions of the divert switch and crossover switch.

The slat sorter 14 is designed to selectively divert articles 16 from forward travel along a main line conveyor 17 and transfer them to a takeaway conveyor 18 positioned at a desired location along one side of the main line conveyor. It can be appreciated that any number of takeaway conveyors 18 may be utilized in cooperation with the main line conveyor 17 and positioned at strategic locations longitudinally along and on either side of the main line conveyor. FIG. 1 depicts a right hand divert switch 10 designed to divert articles 16 to a takeaway conveyor 18 positioned on the left side of the main line conveyor 17 as viewed in the direction of forward travel. It can be visualized that a left hand divert switch 10 may be positioned on the left side of the main line conveyor 17 to direct articles 16 to a takeaway conveyor 18 abutting the right side of the main line conveyor. Left hand and right hand divert switches 10 are mirror images of each other and the references to components of the divert switch 10 apply to each design.

The transport surface is defined by a plurality of transverse tubes or slats 20 that extend between sides 21 of the conveyor frame. The transport surface is driven by a sprocket/chain assembly cooperating with a prime mover such as a motor. The motor and sprocket combination M contemplated for use with the slat sorter 14 is of common design and thus is only illustrated schematically in FIG. 7.

Figure 2:
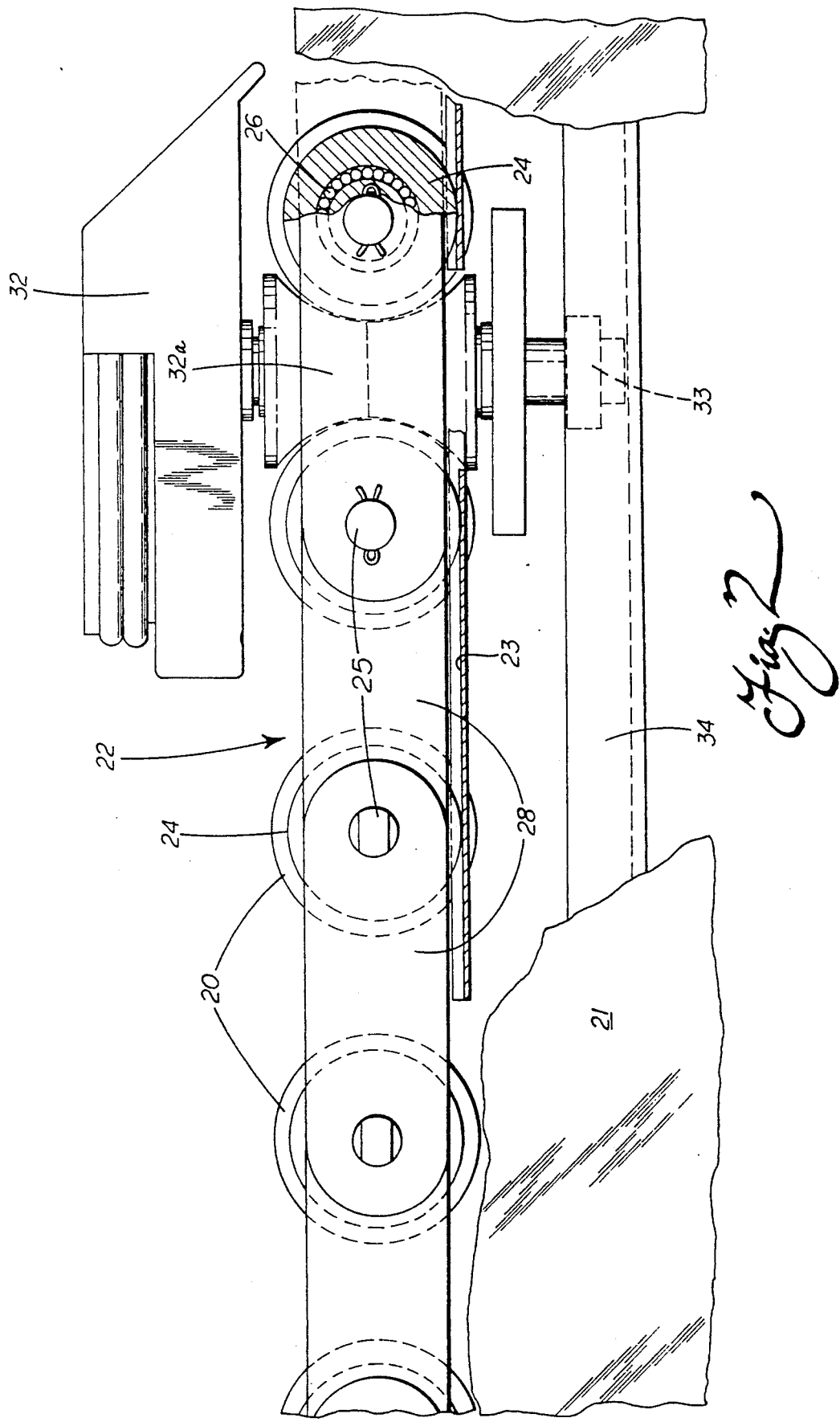
FIG. 2 is a side view of the slat sorter with a portion of the side frame broken away, showing the divert shoe supported on the transverse rollers of the transport surface and its depending guide member, and further illustrating the bearing chain utilized in driving the main line conveyor.

An important aspect of the slat sorter 14 is the use of a bearing chain 22 riding in side tracks 23, one being shown in FIG. 2, for cooperation with the driving sprocket. The preferred embodiment of the invention contemplates the use of a precision bearing chain 22. The precision bearing chain is a standard commercial item and can be purchased from vendors such as Acme Chain, Inc. of Holyoke, Mass. The precision bearing chain 22 is comprised of a plurality of bearing rollers 24 having internal needle bearings 26. The bearing rollers are connected by connector links 28 to form the chain 22. The bearing rollers 24 have non-rotating stub shafts 25 fixed to the links 28 that cooperate to support the slats 20. Accordingly, it can be appreciated that as the prime mover drives the precision bearing chain 22 through the sprocket, the slats 20 forming the transport surface are propelled for forward travel.

The use of the precision bearing chain 22 reduces the friction associated with main line conveyor motion and thus the power requirements. Accordingly, the chain 22 further enhances the efficiency of the slat sorter 14.

In general operation, articles 16 travel along the main line conveyor 17 in the direction of arrow A from a processing station or stations upstream. A plurality of pusher elements or divert shoes 32 are mounted for movement with the slats 20 in the direction of forward travel A in a straight-through mode defining continued article conveyance for downstream handling. In this mode, the shoes 32 are guided along either of opposing sides of the main line conveyor 17. The destination of the article is predetermined and programmed into programmable controller C (see FIG. 7 and description below) associated with the slat sorter 14.

When the article 16 is approaching the takeaway conveyor 18 that carries it to its ultimate destination, the controller C initiates the divert mode. It can be appreciated that the controller monitors article size and position and slat sorter speed and coordinates this information with the location of the desired takeaway conveyor 18. The controller assigns a set of divert shoes 32 to the article and directs the appropriate divert switch 10 to intercept this specific set of shoes at the proper time.

The leading divert shoe 32 of the set approaching the divert switch 10 is sensed and a signal is transmitted for diversion of the assigned shoes. As shown, the set of divert shoes 32, each shoe being mounted on a pair of concave rollers 32a (see FIG. 2), slides transversely across the slat sorter 14 in a diagonal direction in response to a divert signal; thus engaging and directing each article 16 in accordance with the flow arrow B to the desired takeaway conveyor 18.

When the shoes 32 thus diverted reach the opposite side of the main line conveyor 17, they continue long that side during forward travel of the transport surface. They are thus in position to divert articles 16 in the opposite direction following a return run to the entry point of the main line conveyor 17. Alternatively, the divert shoes 32 may be returned to the original side of the main line conveyor 17 during the return run to prepare for repeat divert operation.

Each divert shoe 32 includes a guide member 33 that depends from the shoe body. In the preferred embodiment, the guide member 33 is a roller. In the straight-through mode, the roller 33 engages and is guided by straight-through guide track 34 (see FIG. 1). Likewise, the roller 33 engages and is directed along the diagonal guide track 36 when in the divert mode. It can be visualized that the engagement between the guide member 33 and the appropriate guide track 34, 36 provides positive directional control for the divert shoe 32.

Figure 3:
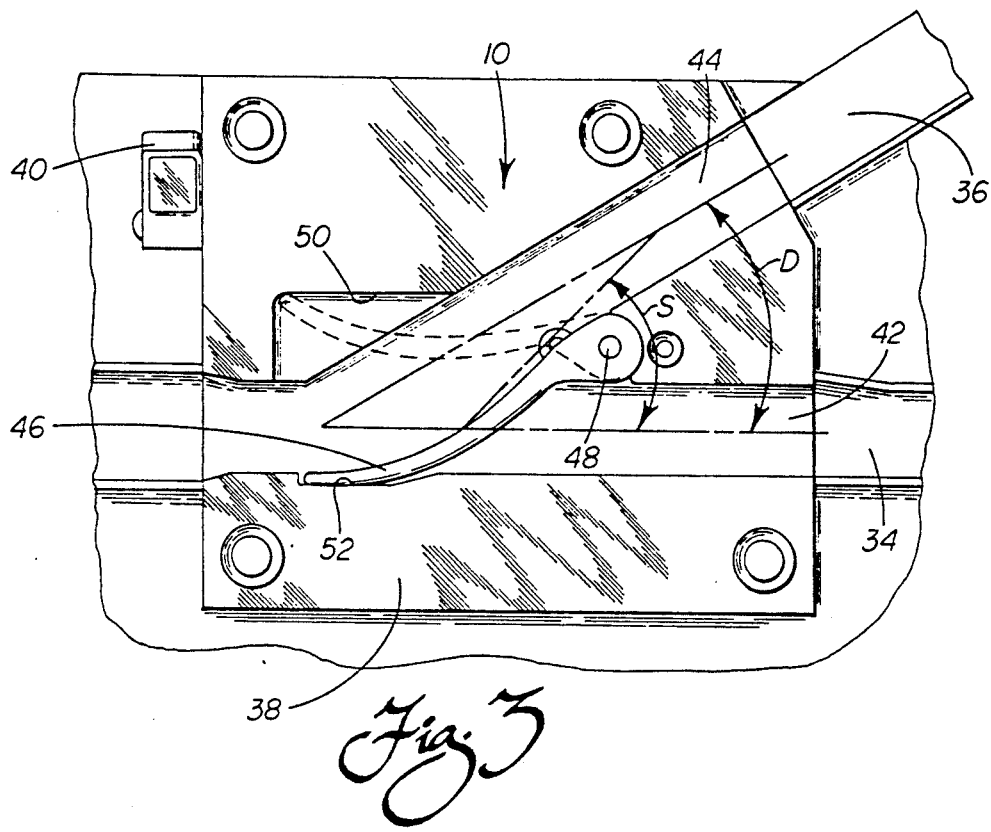
FIG. 3 is an enlarged plan view of the divert switch of the present invention, showing the divert position in full line and the home position in phantom line.
Figure 4:
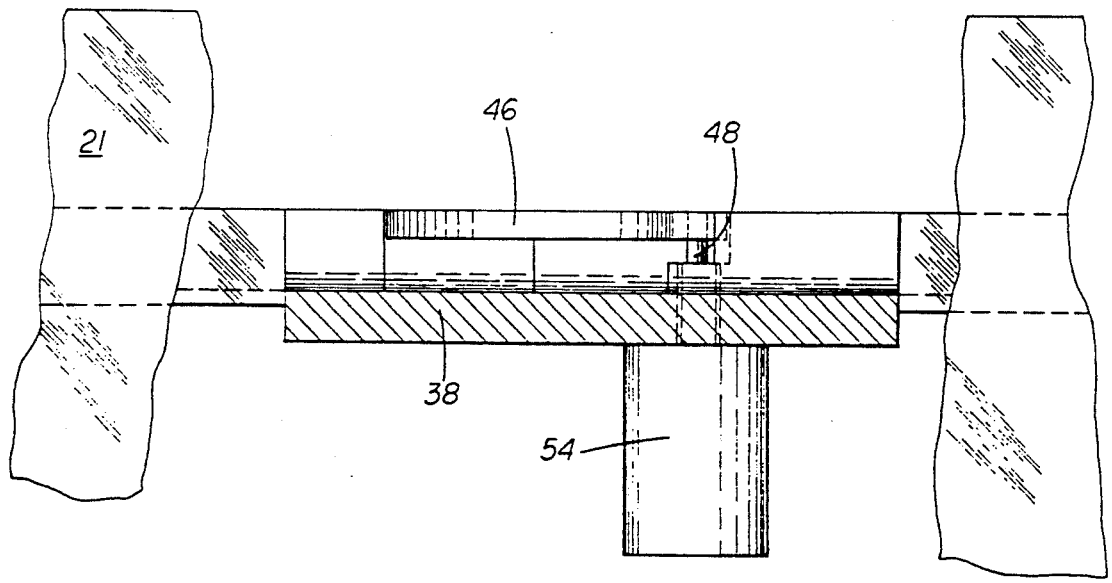
FIG. 4 is a side view of the divert switch of the present invention, showing the rotary solenoid in position beneath the base of the divert switch.

As shown in FIGS. 3 and 4, the inventive divert switch 10 comprises a base 38 that is mountable to the frame of the main lien conveyor 17. In the preferred embodiment, an optical sensor in the form of a photocell 40 is attached to the base 38 immediately upstream from the divert location. The photocell 40 senses the divert shoes 32 passing by and transmits signals to the controller which calls for divert operation at the appropriate time.

The base 38 is formed with a straight-through channel 42 that is aligned with the straight-through guide track 34. The base 38 also includes a divert channel 44 that is oriented at an oblique angle relative to the straight-through channel 42 and aligns with the diagonal guide track 36.

The divert switch 10 includes a switch arm 46 that is manipulated to intercept and divert the guide member 33 of the divert shoe 32 when the divert mode is initiated. As shown in FIG. 3, the switch arm 46 is mounted on a pivot pin 48 that allows the switch arm to pivot between a home position shown in phantom line and a divert position shown in full line. It can be appreciated that when the switch arm 46 is in the home position, the divert shoes 32 proceed along the straight-through channel 42 in a forward direction with the transport surface. Alternatively, when the switch arm 46 is in the divert position, the arm engages the roller 33 of the divert shoe 32, altering its course and directing it into the divert channel 44 to proceed with divert mode operation.

The base 38 is also formed with a home recess 50 and a divert recess 52 to allow the switch arm 46 to properly cooperate with the guide roller 33 of each divert shoe 32 traveling in both the straight-through and divert modes.

In an important aspect of the invention, the divert switch 10 includes means to positively actuate the pivoting movement of the switch arm 46 in both directions; i.e. from home position to divert position and from divert position to home position. A rotary solenoid 54 is the preferred actuator and directly cooperates with the pivot pin 48 to positively drive the switch arm 46 into both the divert and home positions.

The rotary solenoid 54 is capable of pulsing in both the clockwise and counterclockwise directions. Referring to the right hand divert switch 10 shown in FIG. 3, upon pulsing in the counterclockwise direction, the switch arm 46 is positively driven from the home position to the divert position. Likewise, when the rotary solenoid 54 pulses in the clockwise direction, the switch arm 46 is positively driven from the divert position to the home position. A dual position, over-center spring (not shown) may be provided with the switch arm 46/rotary solenoid 54 assembly to function only for holding the switch arm 46 in the desired position. In other words, the spring biases the arm with a minimum holding force only after passing over the center of movement in either direction.

The rotary solenoid 54 generates faster switching motion for the switch arm 46 and therefore allows the slat sorter 14 to operate at higher speeds. More particularly, the switching time measured for the rotary actuator of the preferred embodiment is approximately 8-$\frac{1}{2}$ milliseconds as compared with 30 milliseconds for commonly used pneumatic devices. This allows the slat sorter 14 incorporating the novel divert switch 10 in combination with the programmable controller C to operate at an upper limit running speed approximately 15%-20% higher than possible with prior art sorting conveyor assemblies.

The switch arm 46 is preferably fabricated from a high strength, lightweight plastic, such as ABS plastic, to decrease its moment of inertia. Since the rotary solenoid 54 drives the switch arm positively in both directions, the incorporation of a return spring that forces the switch arm 46 back to the home position is obviated. Furthermore, the rotary solenoid 54 generates switch arm actuation without altering its planar position. Therefore, the use of the rotary solenoid 54 minimizes the space requirements as compared with actuators that operate through vertical, or other positional change.

The rotary solenoid 54 used as a component in the novel divert switch 10 is provided by an outside vendor according to the particular parameter requirements for desired slat sorter operation. The design considerations include the length of switch arm travel, the rotational mass moment of inertia of the switch arm and the required switching time. The rotary solenoid 54 of the preferred embodiment may be purchased from Lucas Ledex, Inc. of Vandalia, Ohio.

In an additional important aspect of the inventive divert switch 10, the switch arm 46 is provided with an arcuate contour or curvature. This aids in the smooth engagement between the switch 46 and the roller 33 of the divert shoe, providing even transition from straight through mode to divert mode.

Furthermore, when in the divert position, the guide surface of the switch arm 46 curves to a point adjacent the exit with the guide member 33 of the divert shoe 32 where a tangent extending therefrom defines an angle relative to forward travel that is greater than the divert angle (see FIG. 3). More particularly, the common divert angles are 30° up to speeds of about 400 ft/min and 20° for higher speeds. FIG. 3 illustrates a 30° divert angle D. The preferred embodiment of the switch arm 46 defines a maximum angle S of the guide surface to be 45° relative to forward travel. This configuration allows the divert shoe 32 to pass through the divert switch 10 in a smoother fashion, thus facilitating a shorter transient time through the switch, and a higher speed operation. Simply stated, the particular configuration of the switch arm 46 relative to the overall switch design optimizes the time/space relationship for effective switch operation.

An additional benefit of the increased switching time relates to the positioning of the photocell 40. More specifically, in prior art designs, as conveyor speed approaches the upper allowable limit, the sensor requires slight positional adjustments in order to effectuate proper timing for switch actuation. The photocell 40 used in combination with the inventive divert switch 10 does not require such adjustment. It is positioned along the main line conveyor 17 at the desired upstream position and operates effectively at that position for all operational speeds.

Referring again to FIG. 1, the slat sorter 14 is shown with a crossing track network so that it may be adapted to divert articles 16 towards both sides of the main line conveyor 17 at substantially the same longitudinal position. The crossing network includes the diagonal guide tracks 36 on which the divert shoes 32 are guided when in the divert mode. With such a design, a crossover switch 12 is presented at the crossing point of the network. The crossover switch 12 is mounted to the chassis of the slot sorter 14 beneath the transport surface as shown in FIG. 1.

Figure 5:
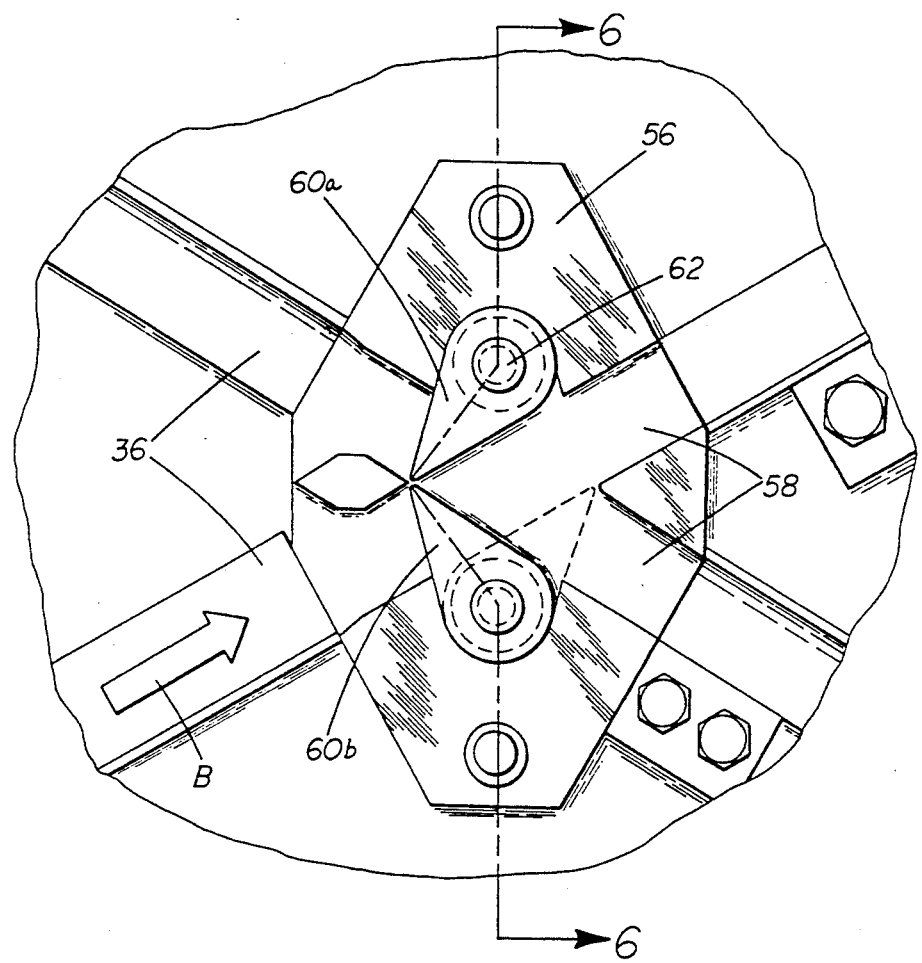
FIG. 5 is an enlarged plan view of the crossover switch of the present invention showing the guide fingers at the rest position in full line with one guide finger shown in phantom line as pivoted to a pass position.
Figure 6:
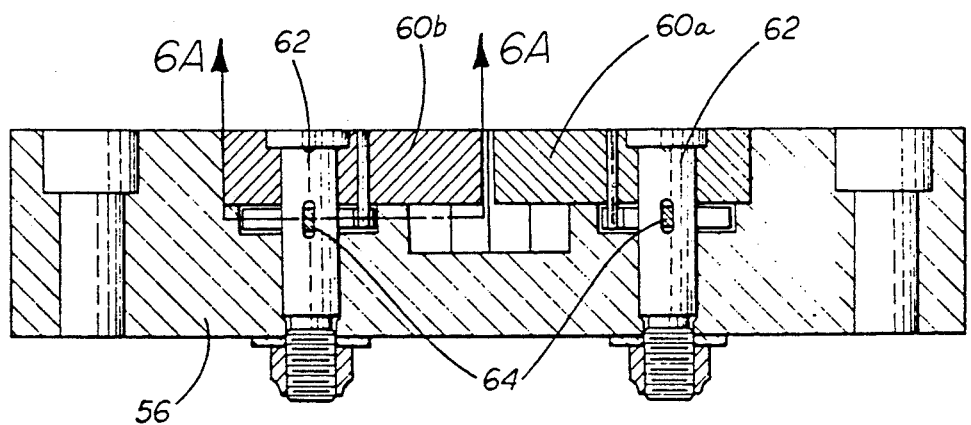
FIG. 6 is a cross sectional view of the crossover switch of the present invention taken along lines 6—6 of FIG. 5.
Figures 6A, 7:
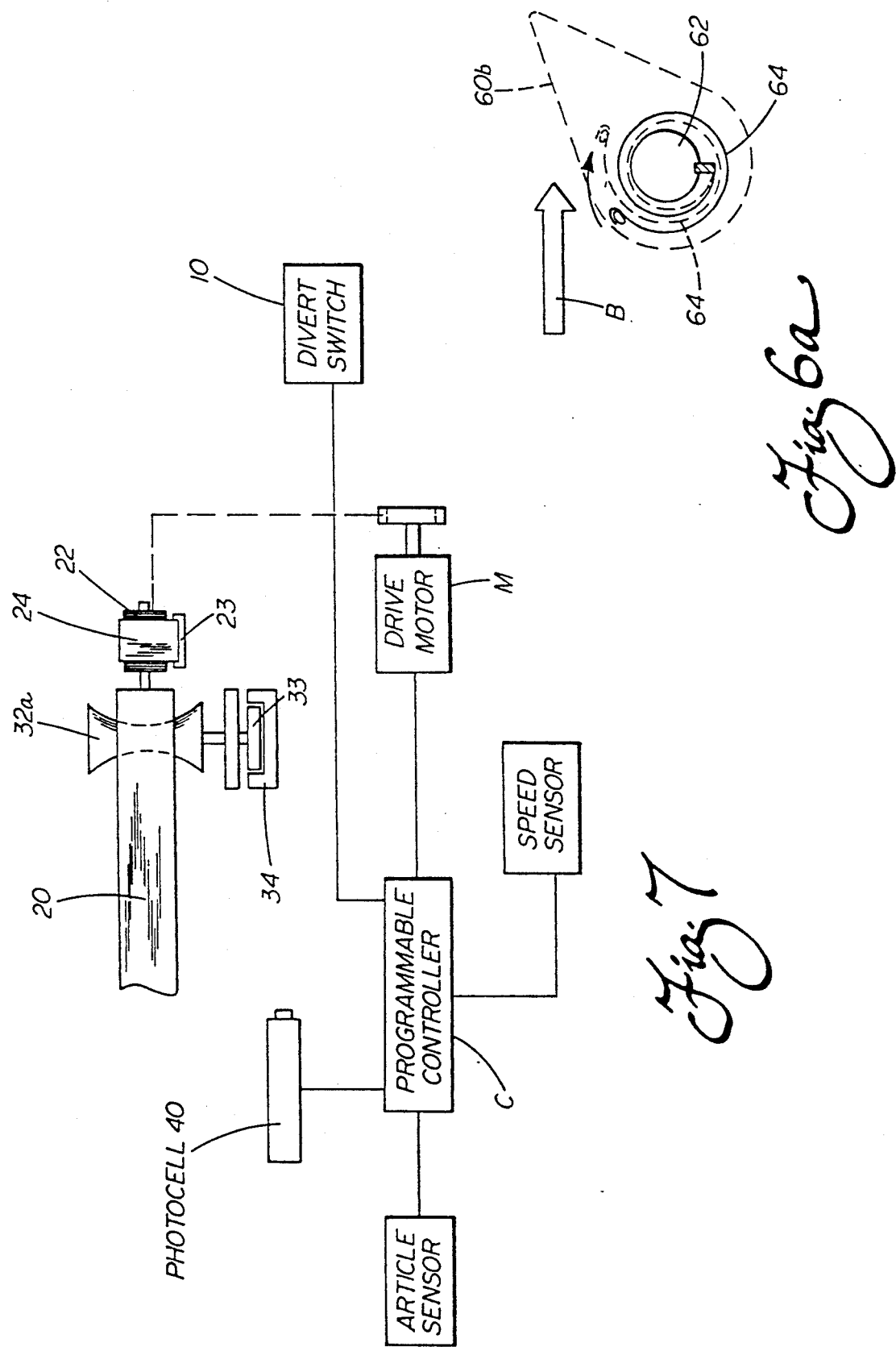
FIG. 6A is a cross sectional view of a guide finger pivot pin of the crossover switch taken along lines 6A—6A of FIG. 6, particularly showing the action of the torsion spring.
FIG. 7 is a schematic view of the control circuit associated with the inventive slat sorter.

The crossover switch 12 is presented in more detail in FIGS. 5, 6 and 6A. The switch 12 includes a base 56 that is attached to the slat sorter chassis. The base 56 includes crossing channels 58 that are aligned with the respective diagonal guide tracks 36.

A pair of guide fingers 60a, 60b are mounted for pivotal operation on the base 56. More specifically, the guide fingers 60a, 60b are mounted on pivot pins 62 that allow rotational motion.

The inventive crossover switch 12 is adapted for purely mechanical operation. The guide fingers 60a, 60b are actuated solely by contact with the rollers 33 of the divert shoes 32. Thus, there is no need for extraneous actuators.

With reference to FIG. 5, the guide fingers 60a, 60b are shown in full line illustration at their rest position. The orientation of FIG. 3 is such that the divert shoes 32 travel on the track 36 in the direction of arrow B when in the divert mode. Visualizing the divert shoes 32 traveling in divert mode operation, each roller 33 of the divert shoes 32 enters the channel 58 from the diagonal guide track 36 and engages the side of the guide finger 60b. The force of each roller 33 acts to pivot the guide finger 60b away from its rest position, to its path position, as shown in phantom line. It can thus be visualized that a free path is momentarily created between adjacent sides of the guide fingers 60a, 60b. Thus, the divert shoe 32 is allowed to pass through the crossover switch 12 and continue its divert operation.

In the preferred embodiment, each pivot pin 62 mounts a helical, torsional action spring 64 (see FIG. 6A). Immediately after the divert shoe 32 exits the path P through the crossover switch 12, the spring 64 biases the previously pivoted guide finger 60b back to its rest position. It can be appreciated that both guide fingers 60a, 60b operate in an identical manner to allow divert shoes 32 to pass the crossover switch 12 in either direction.

The guide fingers 60a, 60b are also preferably fabricated from a high strength, lightweight plastic. The use of such material enhances the operational characteristics of the guide fingers 60a, 60b and provides durability for a long service life.

In summary, numerous benefits result from employing the concepts of the present invention. The rotary solenoid 54 incorporated as part of the divert switch 12 generates positive actuating motion to pivot the switch arm 46 to both the home position and the divert position. This generates quicker switching time than with previous switch designs employing pneumatic switches with mechanical linkages. The slat sorter 14 incorporating the divert switch 10 is capable of operating at higher speeds. Additionally, the faster switching time obviates the need to adjust the position of the photocell 40 at speeds approaching the upper limit.

The crossover switch 12 is designed for pure mechanical operation and thus eliminates the need for extraneous actuators. The guide fingers 60a, 60b are mounted on pivot pins 62 and swing away upon being engaged by the roller 33 of the divert shoe 32. Once the divert shoe 32 has passed the guide fingers 60a, 60b and is exiting the crossover switch 12, a torsion spring 64 biases the previously pivoted guide finger back to its rest position. It can be appreciated that the use of both the divert switch 10 and the crossover switch 12 with their simplified designs provide significant cost reduction for the overall conveyor system while permitting higher speed operation and dependable efficiency.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A divert switch for a sorting conveyor system having pusher elements that selectively engage and direct articles from a main conveyor to a lateral takeaway conveyor, comprising:

a base, having a plurality of stationary guide channels, for attachment to the main conveyor;

a switch arm connected to said base and movable across said stationary guide channels between a home position for straight-through travel of said pusher elements and a divert position for directing said pusher elements to engage and direct said articles to said takeaway conveyor; and means for selectively actuating the movement of said switch arm to both said home and divert positions.

2. The divert switch of claim 1, wherein said selective actuating means comprises a rotary solenoid.

3. The divert switch of claim 2, wherein said rotary solenoid directly mounts said switch arm for pivoting movement.

4. The divert switch of claim 1, wherein said switch arm has a guide surface with an arcuate contour.

5. The divert switch of claim 1, wherein said switch arm has an arcuate contour such that in a divert position a tangent drawn along its guide surface at a point adjacent the exit of engagement between said arm and said pusher elements defines an oblique angle relative to the axis of forward travel that is greater than the divert angle.

6. The divert switch of claim 1, further comprising a sensor attached to said conveyor frame upstream from said switch arm.

7. The divert switch of claim 6, wherein said sensor cooperates with a programmable controller so as to be positionable in a desired fixed location along said main conveyor and is maintainable in said fixed position regardless of the operating speed of said main conveyor.

8. A crossover switch for a sorting conveyor system having a crossing guide network for guiding pusher elements that selectively engage and direct articles from a main conveyor to a takeaway conveyor positioned on either side of said main conveyor, comprising:

a base for attachment to said main conveyor;

a plurality of channels in said base for receiving guide members on said pusher elements;

a plurality of guide fingers each pivotable by direct contact with said guide members between a rest position blocking the channel of travel and a path position away from the channel of travel; and means for generating return motion of the pivoted guide finger from said path position to said rest position, whereby said crossover switch operates without extraneous actuation to facilitate the travel of said pusher elements when diverting articles to said takeaway conveyor.

9. The crossover switch of claim 8, wherein said return motion generating means comprises a torsion spring.

10. A sorting conveyor system for selectively diverting articles from a main conveyor to a lateral takeaway conveyor, comprising:

a frame defining said main conveyor;

a transport surface mounted for relative movement on said frame for supporting said articles;

means for driving said transport surface in a forward direction;

pusher elements mounted on said transport surface for travel selectively along with said transport surface in a forward direction or diagonally across said transport surface so as to engage and direct articles to said takeaway conveyor;

means for guiding said pusher elements along both the forward direction and the diagonal direction;

a divert switch comprising a base having a plurality of stationary guide channels and a switch arm connected to said base and movable across said stationary guide channels; and means for selectively actuating said switch arm for movement between a home position to allow said pusher elements to travel along with said transport surface in a forward direction and a divert position to direct said pusher elements for diagonal travel across said transport surface.

11. The sorting conveyor system of claim 10, wherein said selective actuating means comprises a rotary solenoid.

12. The sorting conveyor system of claim 11, wherein said rotary solenoid directly mounts said switch arm for pivoting movement.

13. The sorting conveyor system of claim 10 wherein said switch arm has an arcuate contour.

14. The sorting conveyor system of claim 10 wherein said switch arm has an arcuate contour such that in a divert position a tangent drawn along its guide surface at a point adjacent the exit of engagement between said arm and said pusher elements defines an oblique angle relative to the axis of forward travel that is greater than the divert angle.

15. The sorting conveyor system of claim 10, wherein said transport surface comprises a plurality of transverse slats mounted between sides of said frame.

16. The sorting conveyor system of claim 15, wherein said driving means comprises a transmission roller chain mounted to opposing ends of said transverse slats, said chain having bearings incorporated directly into the rollers thereof, and a drive motor/sprocket for driving said chain.

17. The sorting conveyor system of claim 14, wherein is provided a home recess and a divert recess in said switch to accommodate the movement of said switch arm.

18. The sorting conveyor system of claim 10, wherein is further provided a crossover switch having a crossing guide network for guiding the pusher elements for selectively engaging and directing the articles from the main conveyor to the takeaway conveyor, including a base for attachment to said main conveyor;

a plurality of channels in said base for receiving guide members on said pusher elements;

a plurality of guide fingers each pivotable by direct contact with said guide members between a rest position blocking the channel of travel and a path position away from the channel of travel; and means for generating return motion of the pivoted guide finger from said path position to said rest position.

19. The sorting conveyor system of claim 18, wherein said return motion generating means comprises a torsion spring.

20. A divert switch for a sorting conveyor system having pusher elements that selectively engage and direct articles from a main conveyor to a lateral takeaway conveyor, comprising:

a base for attachment to the main conveyor;

a switch arm connected to said base and movable between a home position for straight-through travel of said pusher elements and a divert position for directing said pusher elements to engage and direct said articles to said takeaway conveyor;

a home recess and a divert recess in said base to accommodate the movement of said switch arm; and means for selectively actuating the movement of said switch arm to both said home and divert positions.

21. The divert switch of claim 20, wherein said selective actuating means comprises a rotary solenoid.

22. The divert switch of claim 21, wherein said rotary solenoid directly mounts said switch arm for pivoting movement.

23. The divert switch of claim 20, wherein said switch arm has a guide surface with an arcuate contour.

24. The divert switch of claim 20, wherein said switch arm has an arcuate contour such that in a divert position a tangent drawn along its guide surface at a point adjacent the exit of engagement between said arm and said pusher elements defines an oblique angle relative to the axis of forward travel that is greater than the divert angle.

25. The divert switch of claim 20, further comprising a sensor attached to said conveyor frame upstream from said switch arm.

26. The divert switch of claim 25, wherein said sensor cooperates with a programmable controller so as to be positionable in a desired fixed location along said main conveyor and is maintainable in said fixed position regardless of the operating speed of said main conveyor.

27. A sorting conveyor system for selectively diverting articles from a main conveyor to a lateral takeaway conveyor, comprising:

a frame defining said main conveyor;

a transport surface for supporting said articles and mounted for relative movement on said frame;

means for driving said transport surface in a forward direction, including a transmission chain wherein means to reduce friction associated with chain movement is incorporated directly in said chain;

pusher elements mounted on said transport surface for travel selectively along with said transport surface in a forward direction or diagonally across said transport surface so as to engage and direct said articles to said takeaway;

means for guiding said pusher elements along both the forward direction and the diagonal direction; and means for diverting said pusher elements from the forward direction to the diagonal direction.

28. The sorting conveyor system of claim 27, wherein said friction reducing means comprises a roller chain wherein a friction reducing rolling element is incorporated within the rollers of said chain.

29. The sorting conveyor system of claim 28, wherein said friction reducing rolling element comprises a plurality of bearings.

30. The sorting conveyor system of claim 28, wherein said friction reducing rolling element comprises a plurality of needle bearings.

* * * * *